3,146,228
N,N'-ETHYLENE BIS[P,P-BIS(1-AZIRIDINYL)-N-METHYL PHOSPHINIC AMIDE] AND HOMOPOLYMER THEREOF

Leon H. Chance, New Orleans, La., assignor to the United States of America as represented by the Secretary of Agriculture
No Drawing. Filed Mar. 15, 1962, Ser. No. 180,053
2 Claims. (Cl. 260—239)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to 1-aziridinyl N-alkyl phosphinic amides, methods of making them and processes for their application to cellulosic materials. More particularly this invention relates to a new compound, N,N'-ethylene bis-[P,P-bis(1-aziridinyl)-N-methyl phosphinic amide], of the following formula:

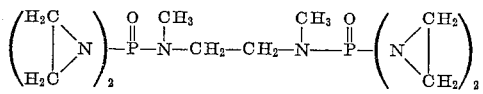

polymers prepared from it, methods of making it, and its application to cellulosic textiles to impart shrink resistance, crease resistance, and flame resistance to said cellulosic textiles.

According to this invention the reactions for the preparation of N,N'-ethylene bis[P,P-bis(1-aziridinyl)-N-methyl phosphinic amide] proceeds according to the following equations:

(1)

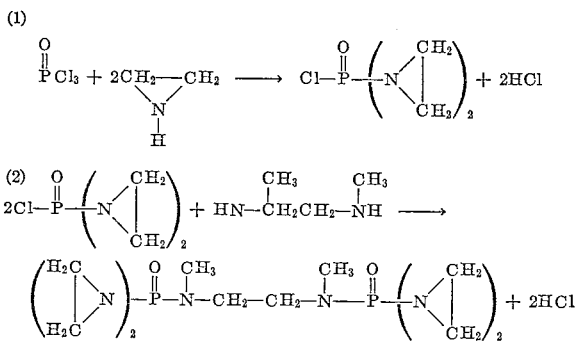

During the course of the reactions represented by Equations 1 and 2, it is necessary to have present a base to serve as an acid acceptor to neutralize the acid produced. This is important because of the sensitivity of the aziridine ring structure to acids. The acid would destroy the aziridine ring and only polymeric materials would result. It is desirable not to isolate the intermediate, bis(1-aziridinyl) chlorophosphone oxide because of its instability, but to proceed directly from the reaction in Equation 1 to the reaction in Equation 2. By this technique it is possible to obtain a product in good yield. The compound described in this invention has certain advantages over related aziridinyl phosphorus compounds such as tris(1-aziridinyl) phosphine axide. It is not hygroscopic, and is stable for a long period of time at room temperature without the aid of a stabilizer. The well known tris(1-aziridinyl)phosphine oxide is very hygroscopic, and requires a stabilizer to prevent polymerization. These properties are of definite advantage when the compound is used as a textile finishing agent.

Polymers in the form of solid synthetic resins can be formed from the compound described herein. It can also be deposited as a polymer on the surfaces and/or in the interstices of cellulosic materials. At the same time, crosslinking of the cellulose molecules can take place between the cellulosic hydroxyl groups and the aziridinyl groups. When such resins are deposited, they reduce the combustibility of cellulosic materials, and impart wrinkle resistance and shrink resistance at the same time.

Other compounds which may be prepared according to the reactions described herein consists of compounds of the following general structure:

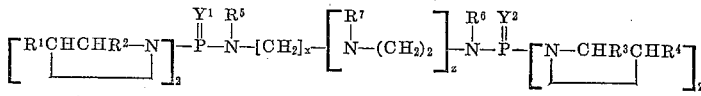

where $R^1$ through $R^7$ each stand for a lower alkyl radical or an aryl radical, $Y^1$ and $Y^2$ stand for oxygen or sulfur, $x$ stands for an interger of 0 to six or more and $z$ stands for an interger of 0 to 6 or more. Some typical examples of such compounds are:

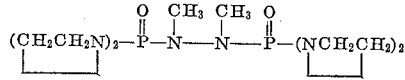

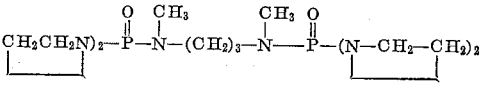

and

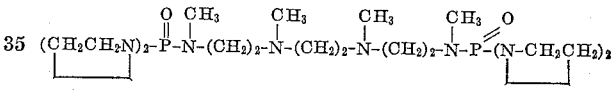

Such compounds may be prepared by reacting the intermediate bis(1-aziridinyl) chlorophosphine oxide or bis(1-aziridinyl) chlorophosphine sulfide with N substituted amines, which contain active hydrogens on the N atoms, such as N,N'-dimethyl hydrazine, N,N'-dimethylpropylene diamine, 1,4,7-trimethyl diethylene triamine, and 1,4,7,10-tetramethyl triethylene tetramine.

Compounds provided by this invention are valuable for use in the production of: synthetic coatings such as protective coatings, and paints and the like having reduced flammability; paper treating resins and textile resins; leather treating agents; insoluble starch; modification of pectic substances and the like. Such compounds are also useful as chemo-sterilants such as insect sterilants, and the like.

It is advantageous to carry out the reaction described herein in anhydrous organic solvents such as benzene, toluene, diethyl ether, and the like, which dissolve the reactants, but which do not react with them. It is very important to exclude moisture from the reaction vessel, in order to obtain a satisfactory yield. This may be achieved by standard methods, such as blanketing the reaction mixture with dry nitrogen. It is necessary to use a base to neutralize the hydrogen chloride liberated during the reaction. Organic tertiary amines such as trimethylamine, triethylamine, or triethanolamine are suitable. However, the invention is not limited to these. The reaction may be carried out by several different procedures but the preferable procedure consists of dissolving the POCl$_3$ in a suitable solvent and placing in an externally cooled reaction vessel. The theoretical amount of ethylenimine required to react with two of the chlorine atoms of POCl$_3$ and the theoretical amount of base required to react with the liberated hydrogen chloride are dissolved in a suitable solvent, preferably the same solvent used in the reaction vessel, and added slowly to the vessel containing the POCl₃. During the course of the reaction, the reaction mixture is well stirred and externally cooled so as to maintain a temperature between about 0° and 20° C., preferably between 5° and 10° C. During the course of the reaction care is taken to exclude moisture from the reaction vessel. This may be done by passing dry nitrogen through the vessel, or some other suitable means. After the first stage of the reaction is completed, then the second stage is carried out. This is accomplished by using the theoretical amount of the amine required to react with the remaining chlorine atom of the intermediate, bis(1-aziridinyl)chlorophosphine oxide (a molar ratio of amine to bis(1-aziridinyl)chlorophosphine oxide of 1:2), and the theoretical amount of base required to neutralize the hydrogen chloride liberated. The amine and the base are dissolved in a suitable solvent, preferably the same solvent used in the first stage of the reaction, and added slowly to the same reaction vessel containing the intermediate. The reaction conditions used in the first stage are maintained throughout the second stage. The product is then isolated as described in the examples. Other techniques of carrying out the reaction were not as successful, as is obvious from the examples given herein.

A considerable portion of a liquid polymeric material was formed as a by-product of the reaction described in this invention. This material is soluble in water, alcohol or acetone, and can be converted to hard insoluble polymers by the application of heat. The monomeric product, N,N'-ethylenebis[P,P-bis(1-aziridinyl) - N - methyl phosphinic amide] can also be converted to hard insoluble polymers by applying heat to the monomer. The polymerization can be carried out in a solvent or in the absence of a solvent, and under neutral, alkaline, or acidic conditions.

The combustibility of cellulosic fibrous materials can be reduced in accordance with this invention by impregnating the fibrous materials with an aqueous solution, or uniform suspension or dispersion, of the monomeric compounds, or the partially polymerized monomer and curing the impregnated materials at the temperatures conventionally used for curing fibrous organic materials.

Where a textile is being treated, it is of advantage to remove excess impregnating liquor by passing the textile through squeeze rolls prior to drying or curing the impregnated textile. It is also advantageous to dry the textile at about 70° to 110° C. before it is cured at a temperature of from about 100° to 170° C.

The degree of crease resistance and flame resistance imparted to a textile by these phosphorus and nitrogen containing resins can be varied from a low degree to a high degree by varying the amount of polymer put in the textile.

The following examples illustrate the details of the invention. The terms "parts" or "percent" refers to parts or percent by weight.

Example 1

Phosphorus oxychloride (30.6 parts) was dissolved in 600 parts of dry benzene. The solution was cooled externally by immersing the reaction vessel in an ice water bath. Dry triethylamine (42.6 parts) and dry ethylenimine (17.2 parts) were dissolved in 300 parts of dry benzene. While the reaction vessel was mechanically stirred the triethylamine and ethylenimine solution was added slowly to the solution of phosphorus oxychloride. After the addition was complete the reaction mixture was stirred for about 30 minutes. During the reaction the temperature of the reaction mixture was maintained at about 5° to 10° C. and dry nitrogen gas was passed slowly through the vessel to maintain a blanket of nitrogen above the surface of the reaction mixture.

Dry N,N'-dimethyl ethylenediamine (8.8 parts) and dry triethylamine (20.2 parts) were dissolved in 300 parts of dry benzene. This solution was added slowly to the stirred reaction mixture, still maintaining the temperature at about 5° to 10° C. After the addition was complete, the ice water bath was removed and the reaction mixture was stirred for about one hour. Then, the mixture was filtered to remove the triethylamine hydrochloride. The filter cake was washed well with dry benzene, and the washings added to the filtrate. To the filtrate was added 3 to 4 parts of triethylamine and 1 part of N,N'-dimethyl ethylenediamine diamine to insure complete reaction. At this point a small amount of white precipitate formed immediately. After cooling overnight in a refrigerator the solution was filtered, and 10.2 parts of white crystals were obtained. These crystals were purified by extracting them from a small amount of triethylamine hydrochloride with boiling benzene. Seven and four tenths parts of pure white crystals were obtained. Additional white crystals were obtained by vacuum distillation of the benzene from the original filtrate from the reaction. Acetone was added to the residue. The white crystalline portion of the residue was not soluble in the acetone. The white crystals were filtered, and 11.7 parts were obtained. The acetone was removed from the filtrate, and 10.4 parts (29.9% yield) of a viscous pale yellow liquid was obtained. A total yield of 19.1 parts (55% yield based on N,N'-dimethyl ethylenediamine) of white crystals were obtained. When recrystallized from ethyl alcohol, the crystals had a melting point of 152.5° to 153.5° C. (corrected). *Elemental analysis.*—Theoretical for N,N'-ethylene bis[P,P-bis(1 - aziridinyl)-N-methyl phosphinic amide]: percent N=24.13, percent P=17.78, percent C=41.37, percent H=7.52: Found: percent N=23.80, percent P=17.44, percent C=41.87, percent H=7.38. Assay for four aziridine ring functions: Theoretical=100%. Found=101.4%. [Ref.; Allen, A. and Seaman, W., Ann. Chem. 27, 540 (1955).]

Example 2

Phosphorus oxychloride (306.7 parts) was dissolved in 2200 parts of dry benzene and placed in the reaction vessel. The vessel was stirred and cooled and blanketed with dry nitrogen in the same manner as in Example 1. Dry ethylenimine (172.0 parts) and dry triethylamine (404.8 parts) were dissolved in 600 parts of dry benzene, and added slowly to the reaction vessel. After the addition was complete the mixture was stirred for 30 minutes, and then filtered. During the filtration the filtering funnel was blanketed with dry nitrogen. The filtrate, presumably containing the intermediate, bis(1-aziridinyl) chlorophosphine oxide, was placed in a second reaction vessel, and stirred and cooled as before. Then, N,N'-dimethyl ethylenediamine (88 parts) and triethylamine (202.4 parts) were dissolved in 600 parts of dry benzene and added slowly to the intermediate. The mixture was stirred for about 4 hours at room temperature and filtered to remove the triethylamine hydrochloride. About 75% of the benzene was removed from the filtrate by vacuum distillation. The remaining 25% of the filtrate deposited 25 parts of white crystals which were separated by filtration. When all of the benzene was removed from the final filtrate, 195 parts of a viscous amber polymeric liquid remained. The yield of white crystals was only 7% (based on the N,N'-dimethyl ethylenediamine), which had the same melting point as those obtained in Example 1.

Example 3

Phosphorus oxychloride (30.6 parts) was dissolved in 400 parts of dry benzene, and placed in a reaction vessel equipped in the same manner as in Example 1. Triethylamine (60.7 parts) was added slowly over a period of about 15 minutes. Ethylenimine (17.2 parts) was dissolved in 100 parts of dry benzene and added slowly to the reaction mixture. After the addition was completed, the mixture was stirred for about 30 minutes more. Then N,N'-dimethyl ethylenediamine (8.8 parts) was dissolved in 100 parts of dry benzene and added slowly to the reaction mixture. After the addition was complete, the mixture was stirred for about 1½ hours and then filtered.

White crystals (3.6 parts) were isolated from the filtrate as in Example 1. This was a yield of only 10% (based on the N,N'-dimethyl ethylenediamine). The crystals had the same melting point as those obtained in Example 1.

*Example 4*

N,N'-ethylene bis[P,P-bis(1-aziridinyl)-N-methyl phosphinic amide] (0.5 part) was dissolved in water, and evaporated to dryness on a steam cone. It was then heated at 145° C. for 10 minutes. A viscous polymer was obtained which hardened to a solid polymer when cooled to room temperature.

*Example 5*

Five parts of the viscous liquid product formed in Example 2 was heated on a steam cone for 4 hours. A tacky red polymer was formed. When 5 parts of the viscous liquid was dissolved in water (pH of the solution was 10.3), and evaporated to dryness on a steam cone for 3 hours, a hard dark red polymer was obtained which was insoluble in water.

*Example 6*

A solution was prepared by dissolving 13.2 parts of N,N'-ethylene bis[P,P-bis (1-aziridinyl)-N-methyl phosphinic amide] in 85.8 parts of distilled water and adding 1 part of a non-ionic wetting agent. The pH of the solution was 8.5. A piece of cotton print cloth was impregnated with the solution, the excess solution squeezed out by passing through a textile padder, the fabric then dried for 4 minutes at 85° C. and cured for 3 minutes at 170° C., and washed and dried. The fabric had a 3.6% weight gain and had improved crease resistance and shrink resistance.

To 82.7 parts of the solution left over from treating the above fabric, was added 1.38 parts of a 40% aqueous solution of zinc fluoborate. The pH of the solution was 5.0. The solution was divided into 3 portions for application to 3 pieces of cotton print cloth. One solution was used immediately after its preparation; the second, 2 hours after preparation; and the third, 24 hours after preparation. All 3 samples were padded through the solution to a wet pick-up of about 70%, dried 4 minutes at 85° C., cured 3 minutes at 170° C., washed, and dried. All samples had a weight gain of about 9%, and had good crease resistance, shrink resistance, and reduced flammability.

I claim:

1. The compound N,N'-ethylene bis[P,P-bis(1-aziridinyl)-N-methyl phosphinic amide] having the formula:

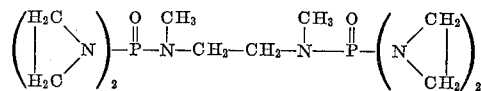

2. The homopolymer of N,N'-ethylene bis[P,P-bis(1-aziridinyl)-N-methyl phosphinic amide formed by heating the monomer at a temperature of about from 100–170° C.

References Cited in the file of this patent

UNITED STATES PATENTS

| | | |
|---|---|---|
| 2,802,824 | Tolkmith et al. | Aug. 13, 1957 |
| 2,886,538 | Chance et al. | May 12, 1959 |
| 2,901,444 | Chance et al. | Aug. 25, 1959 |
| 2,971,815 | Bullock et al. | Feb. 14, 1961 |
| 3,038,776 | Chance et al. | June 12, 1962 |

FOREIGN PATENTS

| | | |
|---|---|---|
| 558,874 | Canada | June 17, 1958 |